Dec. 17, 1940.  F. H. NEWMAN  2,225,080
ROOM THERMOSTAT
Filed May 13, 1938   3 Sheets-Sheet 1

INVENTOR.
Frederick H. Newman
BY John W. Michael
ATTORNEY.

Dec. 17, 1940.  F. H. NEWMAN  2,225,080
ROOM THERMOSTAT
Filed May 13, 1938    3 Sheets-Sheet 2
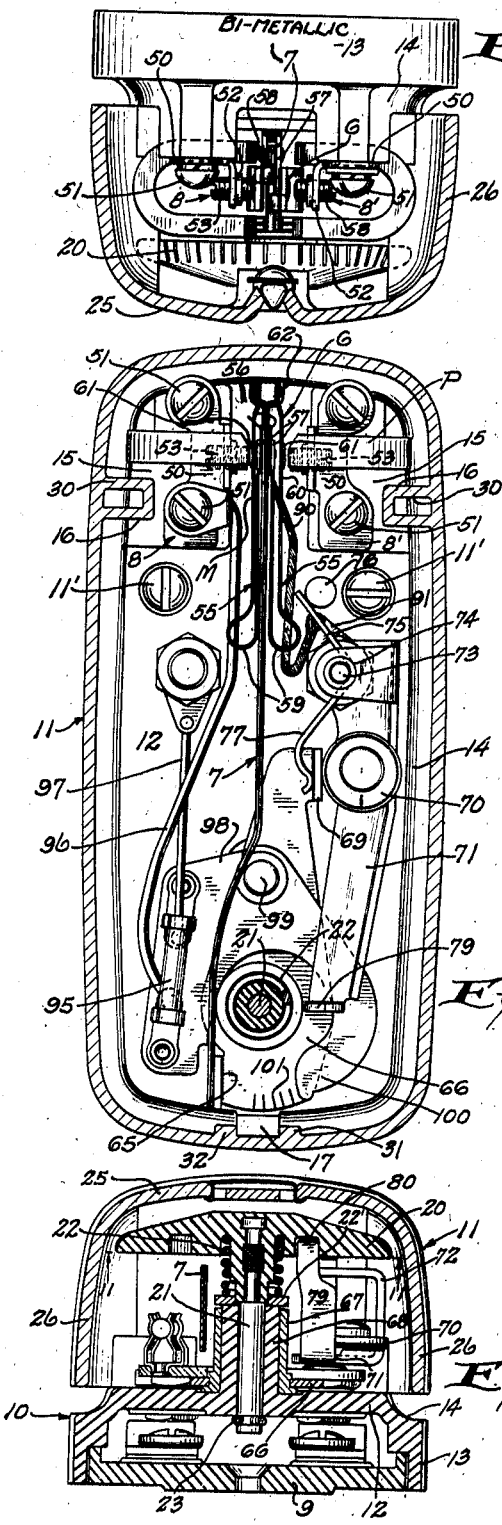
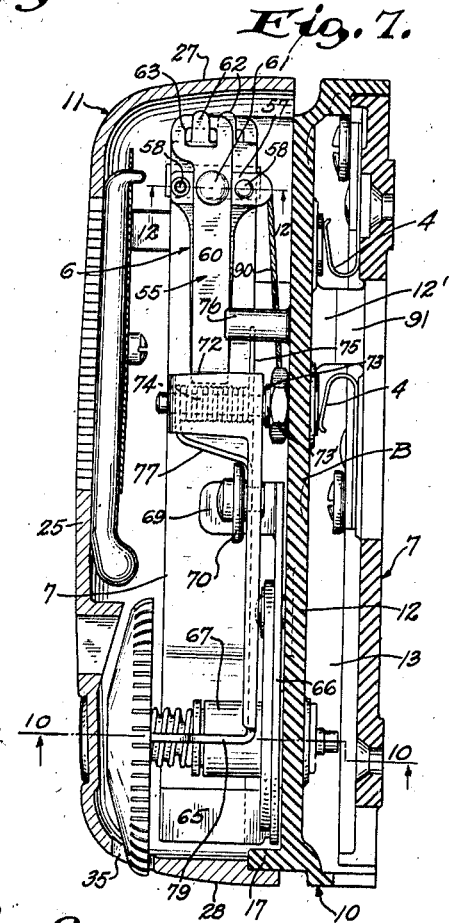
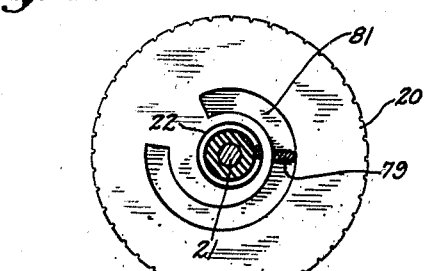
INVENTOR.
FREDERICK H. NEWMAN
BY
John W. Michael
ATTORNEY.

Dec. 17, 1940.  F. H. NEWMAN  2,225,080
ROOM THERMOSTAT
Filed May 13, 1938  3 Sheets-Sheet 3
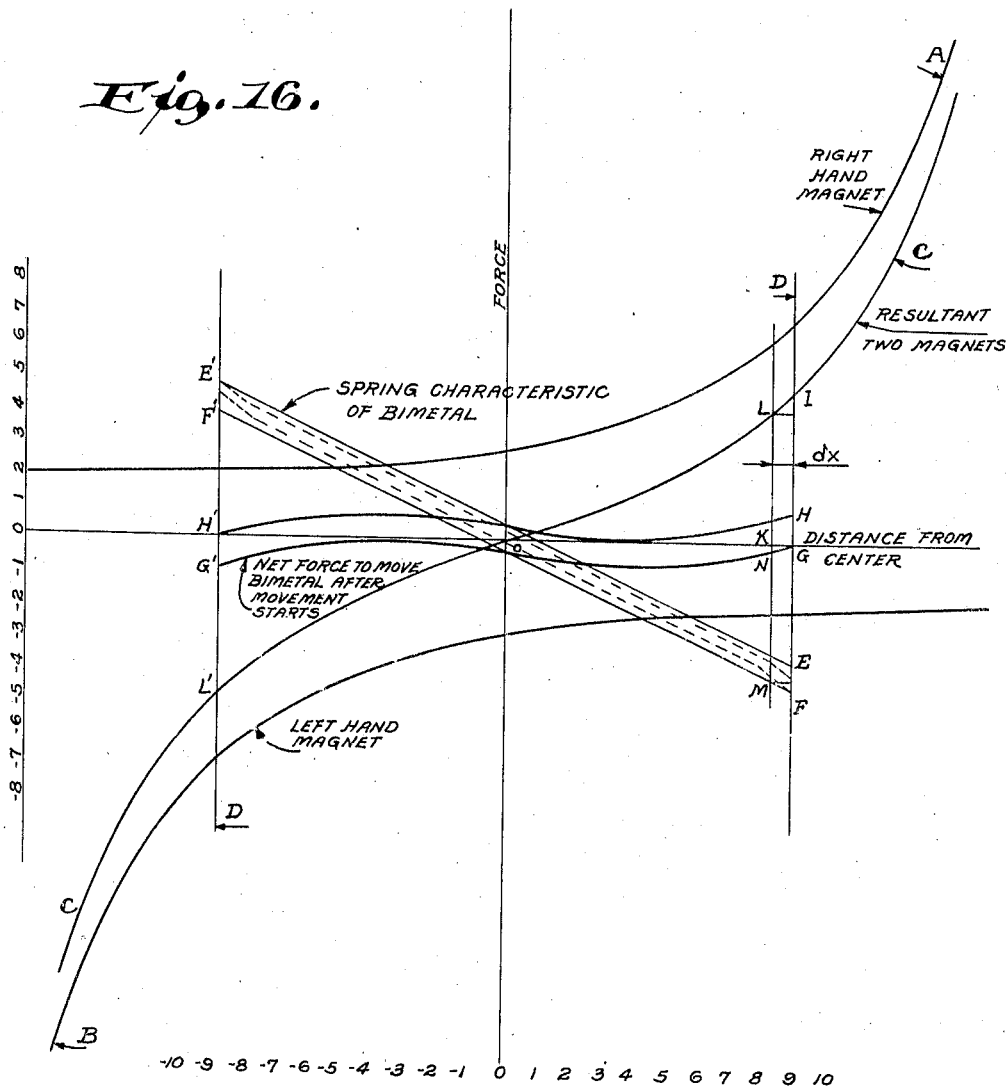
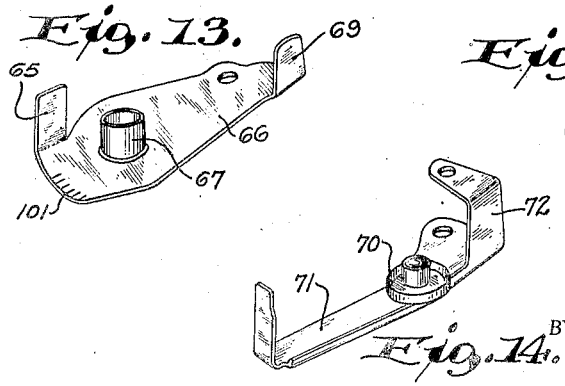
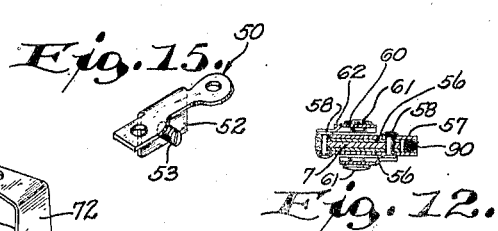
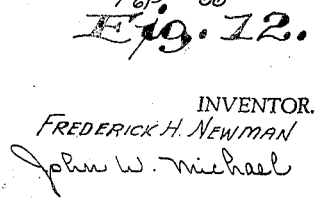
INVENTOR.
FREDERICK H. NEWMAN
BY John W. Michael
ATTORNEY.

Patented Dec. 17, 1940

2,225,080

UNITED STATES PATENT OFFICE 2,225,080

ROOM THERMOSTAT

Frederick H. Newman, Milwaukee, Wis., assignor to Automatic Products Company, Milwaukee, Wis., a corporation of Wisconsin Application May 13, 1938, Serial No. 207,712

22 Claims. (Cl. 200—139)

This invention relates to an improvement in temperature controlling devices and usually takes the form of a thermostat designed to control heating or cooling apparatus although it may be advantageously employed wherever accurate control of temperature is required.

The invention will be shown and described as embodied in that type of instrument widely used as a room thermostat although it is designed and adapted to be used as the control for various types of burners, stokers, blowers, air conditioning systems, motorized valves on direct steam installations, and many other diverse applications.

One of the objects of the invention is to provide an instrument of this character which is highly sensitive and yet positive in its action, a positive make and break action being insured. Any tendency toward hovering or prolonged arcing at the time of making or breaking of contact is precluded.

Another object is to provide a thermostat of this character and having these advantages and which has a wide temperature range thus making the instrument capable of advantageous use with heating or cooling applications.

Another object of the invention is to provide a device of this character and having these advantages and which is so constituted as to insure an even contact pressure which never falls below a certain predetermined minimum thereby insuring making and breaking of contact with a snap action and precluding any appreciable period of zero contact pressure.

Another object of the invention is to provide a casing structure for an instrument of this character which enhances the circulation of air over the thermo-responsive element thereof and markedly improves the appearance of the instrument while leaving the entire front of the casing devoted to the display of the actual room temperature as registered by a thermometer and to the indication of the temperature which the instrument has been adjusted to maintain. The structure also makes provision of convenient access to the adjustable element of the device whereby any specific temperature desired to be maintained may be selected by simply thumbing the exposed periphery of a rotatable disk.

Another object of the invention is to provide a casing structure of this character and having these advantages and which is simple and durable in construction and highly attractive in appearance and so organized and constituted that the front shell of the casing may be readily applied to or removed from the base or back panel and yet is securely though releasably held on the base when applied.

Other objects and advantages reside in certain novel features of the construction, arrangement and combination of parts which will be hereinafter more fully described and particularly pointed out in the appended claims, reference being had to the accompanying drawings forming a part of this specification, and in which:

Figure 7 is a view in vertical cross section taken in the plane on line 5—5 of Figure 1 but illustrating the operating parts of the instrument assembled therewith;

Figure 8 is a view partly in front elevation showing the operating parts of the thermostat, the front shell of the casing being shown in section for the sake of illustration;

Figure 9 is a top plan view of the thermostat, the top of the casing being shown in section for the sake of illustration;

Figure 10 is a view in transverse vertical cross section taken on line 10—10 of Figure 7;

Figure 11 is a detail view in section taken on line 11—11 of Figure 10 and looking in the direction of the arrows;

Figure 12 is a detail view in cross section taken on line 12—12 of Figure 7;

Figure 13 is a detail perspective view of the supporting lever for the bi-metallic element;

Figure 14 is a similar view of the adjusting lever;

Figure 15 is a view of one of the relatively fixed contacts; and

Figure 16 is a view depicting graphically the special manner in which the magnetic fields are balanced against the spring characteristic of the bi-metallic element or other controlling element, to obtain the action desired.

General construction

Figure 1:
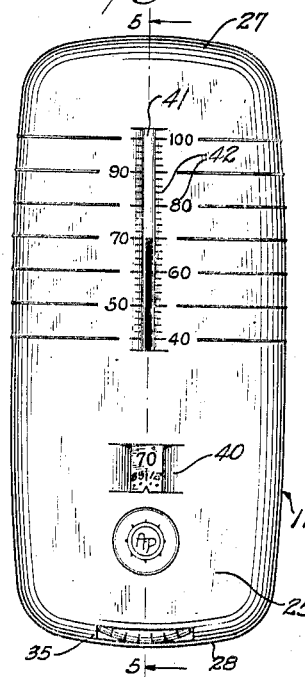
Figure 1 is a view in front elevation showing the exterior of a room thermostat embodying the present invention.

Referring to the drawings, it will be seen that the thermostat comprises generally a terminal mounting board 9, a base or back panel 10, and a cover or front shell 11, the terminal mounting board 9 being supported on the wall, the base being secured thereto by screws 11' or the like and the cover 11 being releasably secured in position on the base or back panel 10 in a manner which will be hereinafter more fully described. The base or back panel 10 and the cover 11 define an enclosure for the operating parts of the instrument which comprises generally relatively fixed contacts 8 and 8', a bi-metallic element 7 adjustably supported on the base and carrying movable contact means 6 cooperable with the fixed contacts 5. Spring contacts 4 mounted on the terminal mounting board carry the current from the terminals of the board 9 to the binding posts or equivalent elements of the base which connect up to the contacts and to the heat anticipator when one is employed.

The novelty of the present invention resides in the casing structure, in the mounting and adjustments of the bi-metallic element 7, in the characteristics of the movable contact means 6, and in the provision of permanent magnets P specially interrelated with the contact means 6 and 8 and the bi-metallic element 7 to secure a special mode of operation and certain desired advantages.

The casing structure will first be described.

Casing or enclosure

Figure 2:
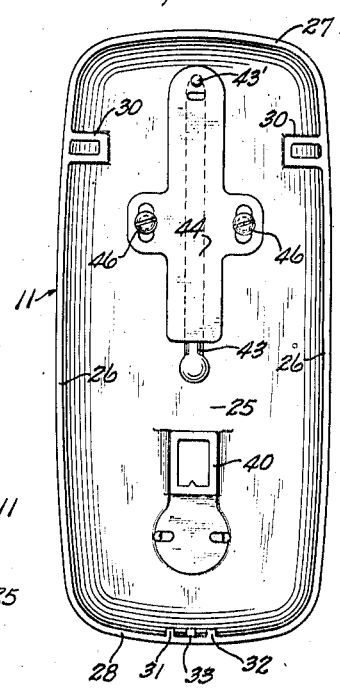
Figure 2 is a view in rear elevation of the front shell of the casing when detached from the base or back panel of the device.
Figure 3:
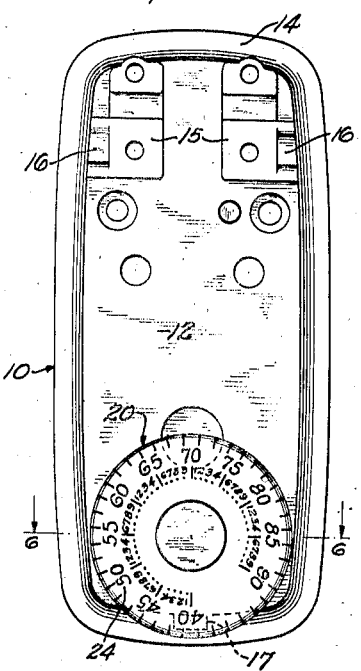
Figure 3 is a view in front elevation of the base or back panel, with the front shell of the casing removed and all of the parts of the thermostat except the adjusting disk omitted.
Figure 5:
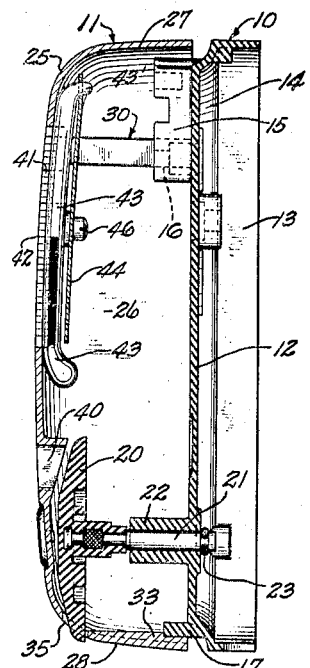
Figure 5 is a view in vertical cross section taken on line 5—5 of Figure 1 and illustrating the device with all of the operating parts thereof except the adjusting wheel or disk and its mounting omitted in order to illustrate how the front shell is releasably secured in position on the base.
Figure 6:
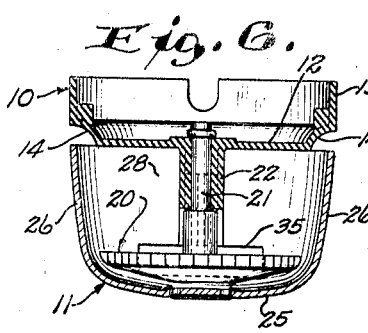
Figure 6 is a view in horizontal cross section taken on line 6—6 of Figure 3 but showing the front shell of the casing applied.
Figure 4:
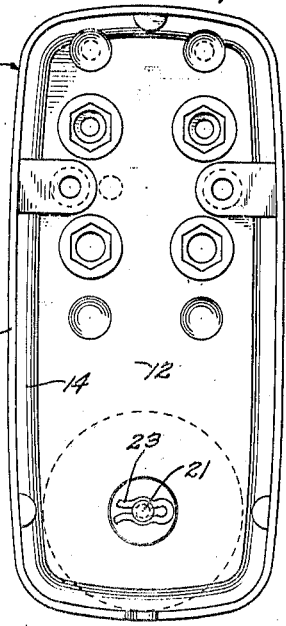
Figure 4 is a view in rear elevation of the base or back panel before the same is applied to the terminal board on which it is mounted and secured.

Referring now particularly to Figures 1 to 6, it will be seen that the base or back panel 10 has a generally flat front wall 12 inset laterally from an integral inwardly directed marginal flange 13 by a curved connecting portion 14, the flange 13 and the connecting portion 14 extending around the entire periphery of the front wall. When the device is in use this flange 13 fits about the periphery of the terminal mounting board 9. The screws 11' which secure the base panel to the terminal mounting board extend through abutting spacing boses 12' and 91 formed on the front wall and terminal board respectively so that when the screws are tightened up the parts will be properly spaced and the spring contacts 4 will be properly engaged with their binding posts.

Adjacent its upper end the base or back panel 10 is provided with integral projections or lugs 15 provided with outwardly facing notches 16 which take part in the attachment of the front shell as will be more fully described.

At the lower end of the base or back panel and located centrally thereof is an outwardly directed tongue 17.

The front shell of the casing has a transversely curved front wall 25 which merges into integral side walls 26 and end walls 27 and 28.

The side walls 26 are provided adjacent the upper ends of the shell with inwardly projecting hollow ribs 30 integral with or otherwise suitably secured to the side walls and also to the front wall if desired. These ribs 30 are dimensioned and proportioned to interfit frictionally with the notches 16 when the front wall is applied. The lower end wall 28 of the front shell is formed with ribs 31, 32 and 33, the ribs 31 and 32 being higher and longer than rib 33 to provide a groove or socket interengageable with the tongue 17 when the shell is applied to the back panel. The short rib 33 provides a stop engageable with the outer end of the tongue 17 to limit the extent to which it enters a groove between ribs 31 and 32.

At the juncture of the lower end wall and the front wall 25 the shell is formed with a slot 35 through which a portion of the periphery of an adjusting disk 20 projects when the shell is applied to the panel.

With this construction the shell is applied to the back panel by engaging the tongue 17 in the grooved socket defined by ribs 31 and 32 and then swinging the shell to cause the periphery of the disk 20 to enter the slot 35 and the hollow ribs 30 to pass into the notches 16. The tongue 17 centers the shell on the back panel and provides a fulcrum about which it may be swung. When the shell is properly mounted on the panel the tongue and its ribs co-act with the ribs 30 and notches 16 and with the disk 20 in maintaining the front shell releasably though securely in position. The arrangement is such that the rib 32 engages the outer end of the tongue 17 and the inner ends of the ribs 30 abut the floors of the notches 16 to cause the inner edges of the side and end walls of the shell to be spaced from the curved connecting portion 14 of the back panel at all points thereabound. This provides for free circulation of air from the exterior through the interior of the casing and yet the provision made for access of air to the interior of the casing throughout the entire peripheral extent of the instrument blends in with the design as a whole and presents no unsightly openings or configurations. While the inner surface of the periphery of the disk 20 bears against the inner wall of the slot 35 the engagement is such as to permit of ready rotation of the disk and this may be accomplished by applying or wiping the thumb against the portion of the periphery of the disk exposed through the slot 35.

Above the slot 35 the front wall of the shell is provided with an opening 40 through which the temperature scale and numerals on the disk may be observed. The front wall may also have in its upper portion a vertical slot 41 provided along each edge with graduations and numerals 42 in correct relation to a thermometer 43 supported on the inner wall of the casing to indicate the degree of temperature according to the Fahrenheit scale. The bulb of the thermometer may be conveniently held in place by a light, resilient metal retaining plate 44 having an aperture in its upper end receiving the inwardly extending top seal 43' of the thermometer and itself fastened in position by screws 46 threaded into inwardly projecting bosses integrally formed with or otherwise secured to the inner wall of the shell.

The back panel 10 is moulded of suitable composition such as "Bakelite" or other similar material. The front shell is also moulded from Celluloid or suitable composition material and is possessed of sufficient resiliency to provide for effective frictional interfitting and yet is rigid enough to maintain its shape when applied. Its walls curve and blend into each other and its exterior presents an attractive luster and if desired, may be ribbed as shown.

Fixed contacts

The relatively fixed contacts 8 and 8' are of identical construction and each includes a sheet metal bracket 50 having a spaced portion apertured to accommodate screws 51 whereby it is secured in position on its lug 15. Each bracket also has an upstanding lug 52 provided with an extruded threaded bearing with which a contact screw 53 is interthreaded. In the assembly the fixed contacts are transversely spaced on the base and are transversely alined, that is, they are opposed to each other. The spacing between the contacts may be varied by adjusting screws 53.

Movable contact means

One end of the bi-metallic element 7 is disposed between the fixed contacts 8 and 8' and this end of the bi-metallic element carries movable contact means 6. The movable contact means 6 comprise two similar contact carriers 55 of identical construction and disposed on the opposite sides of the bi-metallic element. Each movable contact carrier 55 is made up of an elongated strip of resilient metal bent or doubled upon itself so as to assume a generally U-shaped form. The inner leg of each contact carrier has its end portion transversely enlarged and offset from the plane of the leg as indicated at 56. These offset and enlarged portions 56 are disposed flush against the opposite sides of the bi-metallic element and are secured thereto. Laminations 57 are disposed against the exposed faces of the portions 56 and these laminations as well as the portions 56 are permanently fastened to the bi-metallic element by rivets 58. The bight portions 59 of each contact carrier is looped or rounded as shown so that the outer leg 60 thereof is spaced from the inner leg. Moreover the contact carriers are so formed that the legs thereof are intensioned away from each other to a predetermined degree. Contact members 61 are fastened to the outer legs of the contact carriers and are designed to engage the fixed contacts. The extent to which the outer leg of each contact carrier may move away from its inner leg under the influence of its inherent resiliency and tension is limited by means of an offset stop lug 62 integral with the adjacent end of the bi-metallic element 7 and extending through a slot 63 provided in the enlarged outer end of the outer leg 60 of each contact carrier.

Support and adjustment for the bi-metallic element

The bi-metallic element 7 is adjustably supported on the base and for this purpose one end thereof is secured to a lug 65 integral with and extending laterally from a supporting lever 66. The supporting lever 66 is provided with a short sleeve bearing 67 intermediate its ends which is fitted over a tubular post 68 integral with the back panel or base so that the supporting lever is pivotally mounted on the base.

One end of the lever 66 is provided with a second lug 69. The lug 69 bears against the periphery of an adjustable eccentric disk 70 supported on and intermediate the ends of an adjusting lever 71. The eccentric disk 70 is factory adjusted. One end of the lever 71 is provided with a yoke 72 having its opposed portions apertured and fitted over a fulcrum pin 73 whereby the adjusting lever is also pivotally supported on the back panel or base. A nut 73' coacts with the headed end of the pin 73 to secure the pin in position. A spring 74 encircles the fulcrum pin 73 and has one of its terminals extended as at 75 and bearing against an abutment 76 and has its other terminal extended as at 77 and engaging the lug 69 to force it against the periphery of the disk 70. At the end opposite its fulcrum the adjusting lever 71 is provided with a lateral projection 79 constituting a cam follower and having its extremity received in a cam groove 81 provided on the under face of the adjusting disk or wheel 20.

It is obvious that by rotating the disk 20 the lever 71 will be rocked on its fulcrum 73 and its disk 70 will coact with the lug 69 to swing the supporting lever 66 and thereby change the position of the free end of the bi-metallic element with respect to the fixed contact.

The disk 20 is fixed to the outer end of a shaft 21 rotatably supported in the tubular post 68. A spring 22 and washer 22' interposed between the underside of the disk and one end of the post 68 and a cotter pin 23 on the inner end of shaft 21 hold the shaft 21 against axial motion while providing for rotary adjustment thereof. The outer face of the disk 20 is provided with a graduated scale 24 indicating temperatures.

Permanent magnets

These are two horseshoe permanent magnets P of equal intensity and in the present construction they are oppositely arranged and are clamped in grooves provided therefor in the base or back panel by the brackets 50 of the fixed contacts. The magnets are so disposed as to produce a field in the air gap between their poles which is the resultant of the magnetic field of the separate magnets. The desired relationship is depicted graphically in Figure 16 wherein the point midway between the poles of the separate magnets is selected for the zero of the displacement axis. Since the magnets are of equal intensity, the net force at this point caused by the magnets is also zero. Curve "C" shows the force on an armature in the air gap, the resultant of the two curves "A" and "B." Curve "A" shows the attractive force on the armature resulting from the right-hand magnet. Curve "B" shows the attractive force on the armature resulting from the left-hand magnet. Thus, at O on the displacement axis, the pull of the right-hand magnet is 2.8 to the right, and the pull of the left-hand magnet is 2.8 to the left, so the net force resulting from the two forces is zero.

At any point to the right of zero, the right-hand magnet exerts a greater force to the right than the left-hand magnet exerts to the left. An unstable condition is thus created so that the slightest displacement to either side of zero results in a predominating force acting on the displaced magnetic body in the direction of the slight displacement. This is the physical meaning of curve "C." Thus, a displacement of 1 to the right results in a force of .3 acting on an armature. A displacement of 3 to the right results in a force of 1 to the right. Conversely, a displacement of 3 units to the left results in a force of 1 unit to the left. Curve "C" is thus the resultant force of the two magnetic fields, and is the characteristic which must be balanced to the spring rate of the bimetallic element 7 to obtain minimum differential and positive snap operation with no tendency to creep.

The lines D and D' represent the stops, or stationary contacts, at a distance of OG or OG' from the center of the two magnets. When the armature is resting against the right-hand magnet, there is a force represented by GI tending to move the armature to the right, the result of the magnetic field. Since this is a force to the right, the convention of showing it as a positive force is adopted. Conversely, a force to the left is represented as negative. The positive force GI is opposed by a force resulting from the spring characteristic of the bimetal, the magnitude of the force determined by the temperature and physical characteristics (length, width, thickness, material, deflection constant, and difference between ambient temperature and temperature which will cause the bimetal to assume a position midway between the two magnets); the rate at which the force falls off or builds up being determined solely by the physical characteristics.

If the armature has just snapped to the right-hand contact, the force which the bimetal exerts in opposition to the attractive force of the magnets GI is represented by some point, say "E." Since GE, the force to the left, is less than GI, the force to the right, a resultant force to the right which is equal to GI—GE, or equal to GH obtains. The bimetal, in snapping to the right, closed an electric switch which causes the temperature to change (rise or fall). The changing temperature increases the state of strain in the bimetal, causing the force tending to move the armature to the left to increase from GE to some value GF exactly equal to GI. This increased torque stored in the bimetal causes the resultant GH to decrease to zero so that at some temperature the opposing forces of bimetal and magnetic force exactly balance one another. An infinitesimal further change in the temperature of the bimetal now causes the spring force of the bimetal to exceed the attractive force of the magnets, and the armature starts to move to the left. An incremental movement $dx$ to the left causes the force to the right GI to decrease to KL, and the force to the left to decrease to the value KM. The force KM is greater than KL so a net force to the left obtains equal to KM—KL which is equal to KN. The curve GG' shows the resultant force obtained by designing the magnetic field and spring characteristic of the bimetal so that once the armature starts to move, the magnetic attractive force to the right falls off more rapidly than the spring force stored in the bimetal. In other words, the magnetic force falls off along the curve LO L', whereas the spring force falls off along the line FF'. For any value of displacement between O and G, the force represented by FF' is greater than LL' so a net force always obtains to move the contacts as shown by GG'.

The second half of the cycle is exactly similar to the first half. The magnetic attraction is represented by H'L', which is greater than the spring force H'F' by the amount H'G'. A change in temperature in the opposite thermal direction to the change initiating the first part of the cycle is caused by the closing of the contacts to the left. This change in temperature causes the force H'F' to increase to H'E', which is exactly equal to H'L'. A slight additional change in temperature will then cause the armature to snap from the left-hand stop to the right-hand with no pause, chatter, or flutter.

The minimum differential is obtained by so balancing the magnetic and spring forces that the net force depicted by the line GG' actually goes through the zero axis for a short distance, the kinetic energy of the armature being depended upon to carry through into the part of the magnetic field where the attractive force of the magnet again exceeds spring pull.

In the foregoing explanation the effect of the spring carriers 55 of the movable contacts has been ignored in order to simplify the analysis of the phenomenon under discussion. However, these spring carriers perform three main functions, namely:

1. To prevent a period of sustained zero contact pressure.
2. To reduce the differential by making the spring characteristic of the bimetal follow the magnetic attraction curve more closely.
3. To carry the current handled by the switch so as not to heat the bimetal falsely.

Considering these points more in detail it will be seen that at some temperature the attractive force of the armature exactly equals the bimetal spring force. At this temperature a sustained period of zero contact pressure could obtain, resulting in rapid deterioration or welding of the contacts. The carrier spring 55 prevents this by exerting a preset force against the contacts, which is not relieved until the armature snaps over to other contact. This carrier spring determines, therefore, the minimum contact pressure.

It will be seen that the curve CC between the lines D and D' only approaches a straight line, and, therefore, it is impossible to balance a straight line characteristic spring against the magnetic attraction without a large differential. The spring carrier actually changes the straight line characteristic of the bimetal spring, as represented by the line FF' to the adjacent dotted line. The area enclosed between the full lines FF' and EE is a measure of the differential without the contact springs: the area enclosed between the adjacent dotted lines is a measure of the differential with spring carriers. It is thus seen that the use of the spring carriers results in a smaller differential.

While a bimetallic spring element has been shown and described as the controlling element of the structure obviously a flat or coil spring, a blower, a diaphragm, a Borden tube, or other pressure or temperature responsive device with a spring rate might be substituted therefor. Similarly a device may be used not only to open and close contacts but also to open and close a control valve or the like.

Referring now to Figures 7, 8, 10 and 12, it will be seen that the movable contact means are connected into the circuit by a flexible lead 90 having one end soldered to a lug 91 which is clamped on the fulcrum pin 73 by the nut 73'. The head of the fulcrum pin is engaged by one of the spring contacts 4 connected to the lug 91. The other end of the flexible lead is soldered to the projecting ends of the laminations 57.

A small electric heating element 95 known to the industry as a heat anticipator is connected by a conductor 96 to the fixed contact 8 and then back to the circuit by a conductor 97. This heating element is mounted in proximity to the bimetallic element 7 and when the thermostat makes circuit to start the heater being controlled, current also passes through the element 95. This builds up a temperature within the room thermostat to shut off the heater before the desired temperature setting on the thermostat is reached. The stored up heat in the entire system will then cause the temperature to build up until the desired temperature is reached. If this is not accomplished on the first run of the heating unit the action repeats itself until the temperature setting is finally reached. Broadly, this feature forms no part of my invention.

The present invention does propose to provide an adjustment which adapts the device to individual requirements. For this purpose the heating element 95 is mounted on a pivoted "Bakelite" support 98, the support being in the form of a plate-like structure of the outline shown and being pivotally connected as at 99 to the lever 66. The support is formed with a finger piece 100 which travels across the scale 101 on the lever 66. The pivot 99 is a friction pivot so that while the support 98 may be adjusted any selected adjustment will be frictionally maintained. The person making the adjustment is guided by the relation of the finger piece 100 to the scale 101. Generally speaking, adjusting the finger piece 100 to the right as viewed in Figure 8 brings the heating element 95 closer to the bimetallic element to increase the response of the room thermostat to room temperature changes. Moving the support to the left as viewed in Figure 5 decreases the sensitivity of the response.

While I have shown and described a typical construction embodying the present invention it is to be understood that these constructions have been selected merely for the purpose of illustration or example and that various changes in the size, shape and arrangement of the parts may be made without departing from the spirit of the invention or the scope of the subjoined claims.

The invention claimed is:

1. A thermostatic switch of the character described comprising a base, a fixed contact mounted on the base, a thermo-responsive element supported on the base and having a portion disposed in cooperative relation to the fixed contact, and a spring mounted movable contact carried by the thermo-responsive element and cooperable with the fixed contact, said spring mounting being under tension prior to engagement between said contacts, thereby to predetermine the minimum contact pressure therebetween.

2. A thermostatic switch of the character described comprising a base, a pair of relatively fixed contacts mounted on the base, a thermo-responsive element supported on the base and having one end disposed between said fixed contacts, spring contact carriers supported on said end of said thermo-responsive element and tension outwardly therefrom, and movable contacts supported on said carriers and cooperable with said fixed contacts, the contact carriers being under tension prior to engagement between the contacts and being compressed when their movable contacts are engaged with the fixed contacts to predetermine the minimum contact pressure.

3. A thermostatic switch of the character described comprising a base, a fixed contact mounted on said base, a thermo-responsive element in cooperative relation to said fixed contact, a contact carrier comprising a strip of resilient metal doubled upon itself and having one end fixed to the thermo-responsive element, a movable contact supported on the other end of said strip and cooperable with the fixed contact, and means for pre-stressing said carrier.

4. A thermostatic switch of the character described comprising a base, a pair of relatively fixed opposed contacts carried by the base, a bimetallic element having one end mounted on the base and having its free end disposed between said fixed contacts, movable contact means carried by the free end of said bimetallic element and comprising a pair of spring contact carriers, each comprising an elongated generally U-shaped strip having one leg disposed adjacent and parallel to the bimetallic element and provided with an inwardly offset end secured thereto, contacts mounted on the outer leg of each carrier adjacent the outer end thereof, and means for pre-stressing said carriers.

5. A thermostatic switch of the character described comprising a base, a fixed contact mounted on said base, a thermo-responsive element in cooperative relation to said fixed contact, a contact carrier comprising a strip of resilient metal doubled upon itself and having one end fixed to the thermo-responsive element, a movable contact supported on the other end of said strip and cooperable with the fixed contact, and means for limiting the outward movement of said last-mentioned end of said strip.

6. A thermostatic switch of the character described comprising a base, a fixed contact mounted on said base, a thermo-responsive element in cooperative relation to said fixed contact, a contact carrier comprising a strip of resilient metal doubled upon itself and having one end fixed to the thermo-responsive element, a movable contact supported on the other end of said strip and cooperable with the fixed contact, and means for limiting the outward movement of said last-mentioned end of said strip and comprising an offset lug on said element, said end having a slot through which the lug extends.

7. A thermostatic switch of the character described comprising cooperable contacts and a bimetallic element controlling the position of certain of said contacts, and means for adjustably mounting the bimetallic element on the base and comprising a supporting lever therefor fulcrumed on the base, an adjusting lever cooperable with the supporting lever for controlling the position thereof, and having an outwardly extending lug and a rotary cam supported on the base and having a cam groove receiving said lug whereby upon rotation of the cam the supporting lever is shifted to change the position of the bimetallic element.

8. A thermostatic switch comprising a base, a pair of opposed relatively fixed contacts supported on said base, a bimetallic element, a supporting lever pivoted on said base and secured to said element to provide an adjustable support therefor, the free end of said element being disposed between said contacts, movable contact means carried by the free end of said element and cooperable with said fixed contacts, an adjusting lever pivoted on said base and cooperable with said supporting lever to control its position, an adjusting disk rotatably mounted on said base and having a cam groove and a cam follower fixed to said adjusting lever and extending into said cam groove.

9. A thermostatic switch comprising a base, a supporting lever pivotally mounted on said base, a bimetallic element having one end secured to said supporting lever, a pair of relatively fixed opposed contacts supported on the base and between which the free end of said element is disposed, movable contact means carried by the free end of said element and cooperable with said fixed contacts, an adjusting lever pivoted on said base and cooperable with said supporting lever to control its position, an adjusting disk supported for rotation in coaxial relation to said supporting lever and overlying one end of said adjusting lever, and a cam follower on said last named end of said adjusting lever, said disk having a cam groove receiving said follower whereby turning of the disk varies the relation of the movable contact means to the fixed contacts.

10. A thermostatic switch comprising a base, a supporting lever having one end pivotally supported on the base and having lugs extending outwardly therefrom on the opposite sides of its fulcrum, a bimetallic element having one end fixed to one of said lugs, a pair of relatively fixed opposed contacts supported on the base and between which the free end of the bimetallic element is disposed, movable contact means carried by the free end of said element and cooperable with said fixed contacts, an adjusting lever having one end pivoted to the base and having an outwardly extending follower lug at its other end, means interconnecting an intermediate portion of the adjusting lever and the other of said lugs of the operating lever whereby the position of the supporting lever is controlled by the position of the adjusting lever, and an adjusting disk supported for rotation about the axis of fulcrum of the supporting lever and having a cam groove in one face receiving the follower lug of the adjusting lever.

11. A device of the character described comprising a base, a pair of relatively fixed contacts mounted on the base, a thermo-responsive element also mounted on the base and having one end disposed between said fixed contacts and provided with an armature, spring mounted movable contacts carried by the free end of said element and cooperable with the fixed contacts, each of said spring mountings being tensioned when its contact is engaged with the fixed contact to predetermine the minimum contact pressure, and a pair of permanent magnets supported on the base in opposed relation to each other and adjacent said fixed contacts and in cooperative relation to said armature, said thermo-responsive element having a spring characteristic so related to the intensity of the magnetic fields of said magnets that upon the breaking of contact the restoring force of the spring falls off less rapidly than the effective force of the magnetic field on said armature.

12. A thermostatic switch comprising a base, a pair of fixed contacts mounted on the base, a bimetallic element mounted on the base and having its free end shiftable between said contacts, spring contact carriers supported on the free end of said element and intensioned outwardly therefrom, movable contacts supported on said carriers and cooperable with said fixed contacts, said contact carriers being compressed when their movable contacts are engaged with the fixed contacts to predetermine minimum contact pressure, a pair of opposed magnets, one associated with each of said fixed contacts, and an armature carried by the free end of the element and in cooperative relation to said magnets.

13. A room thermostat having a casing comprising a back panel and a front shell having a front wall and integral inwardly directed side and end walls, an outwardly projecting centering tongue on the back panel and disposed centrally of the lower end portion thereof, the lower end wall of the front shell having means providing a groove cooperating with the centering tongue and a stop engageable with its outer end to limit the movement of the shell toward the panel, lugs on the back panel adjacent the sides of the upper end portions thereof and having outwardly facing notches and ribs secured to the side walls of the shell interiorly thereof and frictionally engaged with the notches and also abutting the floors thereof to releasably secure the shell in position on the back panel with the inner edges of the side and end walls of the shell in spaced relation to the panel to provide an air passage entirely around the periphery of the casing through which air may freely flow.

14. A room thermostat having a casing comprising a back panel and a front shell having a front wall and integral inwardly directed side and end walls, an outwardly projecting centering tongue on the back panel and disposed centrally of the lower end wall of the front shell having means providing a groove cooperating with the centering tongue and a stop engageable with its outer end to limit the movement of the shell toward the panel, lugs on the back panel adjacent the sides of the upper end portions thereof and having outwardly facing notches and ribs secured to the side walls of the shell interiorly thereof and frictionally engaged with the notches and also abutting the floors thereof to releasably secure the shell in position on the back panel with the inner edges of the side and end walls of the shell in spaced relation to the panel to provide an air passage entirely around the periphery of the casing through which air may freely flow, in combination with a disk supported on the lower portion of the panel and in spaced relation to the front thereof, said shell having a slot in which the periphery of the disk is received when the front shell is applied to the panel.

15. A room thermostat comprising a back panel having a front wall provided with an inwardly directed marginal flange, a front shell having a front wall and integral inwardly directed side and end walls, and cooperating means between the inside of the front shell and the front wall of the back panel for frictionally and releasably securing the front shell in position on the back panel and for spacing the inner edges of its side and end walls from the adjacent portion of the back panel to provide an air passage entirely around the periphery of the casing and through which air may freely flow.

16. A room thermostat comprising a back panel having a front wall provided with an inwardly directed marginal flange, a front shell having a front wall and integral inwardly directed side and end walls, and cooperating means between the inside of the front shell and the front wall of the back panel for frictionally and releasably securing the front shell in position on the back panel and spacing the inner edges of its side and end walls from the adjacent portion of the back panel to provide an air passage entirely around the periphery of the casing through which air may freely flow, in combination with a disk supported on the back panel adjacent its lower end and in spaced relation to the front wall thereof, said shell having a slot receiving the periphery of the disk when the shell is applied to the back panel.

17. A room thermostat including a casing comprising a back panel, a front shell having a front wall and inwardly directed side and end walls integral with the front wall and with each other, cooperating means between the lower end of the wall of the front shell and the lower end portion of the back panel for centering the shell on the back panel and frictionally interconnecting the two, lugs integral with the back panel adjacent the side edges of its upper end portion and having outwardly facing notches and hollow ribs integral with the side walls of the front shell adjacent the upper ends thereof and located inside the shell and designed to frictionally interfit with the notches of the lugs to aid in releasably securing the front shell to the back panel.

18. A room thermostat including a casing comprising a back panel and a front shell having a front wall and inwardly directed side and end walls integral with the front wall, a centering tongue secured to the back panel and projecting outwardly from the center of the lower portion thereof, the lower end wall of the front shell having ribs providing a groove and stop cooperating with said tongue, and interfitting means between the interior of the side walls of the shell and adjacent portions of the back panel at the upper end thereof to aid in releasably securing the front shell to the back panel.

19. A room thermostat having a casing comprising a back panel and a front shell made up of a front wall and integral inwardly directed side and end walls, means for centering the shell on the back panel and frictionally securing the same thereto and comprising cooperating frictionally interfitting parts on the shell and back panel, said shell having a slot in its lower portion and a disk secured to the back panel and in spaced relation thereto and having its periphery received in the slot when the shell is applied to the panel.

20. A room thermostat comprising a back panel and a front panel including a front wall and side and end walls integral with the front wall, and means for releasably supporting the front shell on the back panel with the inner edges of their side and end walls in spaced relation to the back panel to provide an air passage around the entire periphery of the casing through which air may freely flow.

21. A room thermostat comprising a back panel and a front shell having a front wall and integral inwardly directed side and end walls, means cooperating with the inside of the front shell of the back panel for releasably and frictionally retaining the front shell in position on the back panel with the inner edges of its side and end walls in spaced relation to the back panel to provide an air passage entirely therearound through which air may freely flow, the front wall of the shell being entirely closed except for a slot through which a thermometer may be used and a side opening to permit reading of the setting of the instrument.

22. A room thermostat comprising a back panel and a front panel including a front wall and side and end walls integral with the front wall, and means for releasably supporting the front shell on the back panel with the inner edges of their side and end walls in spaced relation to the back panel to provide an air passage around the entire periphery of the casing through which air may freely flow, in combination with a disk supported on the lower portion of the back panel and in spaced relation thereto, said shell having a slot in which the periphery of the disk is received when the front shell is applied to the panel.

FREDERICK H. NEWMAN.